United States Patent [19]

Preisendoerfer

[11] Patent Number: 5,566,955
[45] Date of Patent: Oct. 22, 1996

[54] SEAL BETWEEN TWO TELESCOPICALLY INSERTABLE CONCRETE COMPONENTS

[75] Inventor: Gerhard Preisendoerfer, Heusenstamm, Germany

[73] Assignee: Forsheda-Stefa GmbH, Germany

[21] Appl. No.: 244,333

[22] PCT Filed: Sep. 21, 1993

[86] PCT No.: PCT/DE93/00898

§ 371 Date: Dec. 27, 1994

§ 102(e) Date: Dec. 27, 1994

[87] PCT Pub. No.: WO94/07073

PCT Pub. Date: Mar. 31, 1994

[30] Foreign Application Priority Data

Sep. 21, 1993 [DE] Germany ............... 9212665 U

[51] Int. Cl.⁶ ................................... F16J 15/10
[52] U.S. Cl. ............. 277/207 A; 285/230; 285/231
[58] Field of Search ................ 277/207 A, DIG. 2, 277/9; 285/230, 231, 910

[56] References Cited

U.S. PATENT DOCUMENTS

| | | | |
|---|---|---|---|
| 3,493,237 | 2/1970 | Kleindienst | 285/230 |
| 3,915,460 | 10/1975 | Kramer | 285/230 |
| 4,842,240 | 6/1989 | Pickett . | |

FOREIGN PATENT DOCUMENTS

| | | | |
|---|---|---|---|
| 0358256 | 3/1990 | European Pat. Off. . | |
| 1298792 | 7/1969 | Germany | 277/207 A |
| 3336339 | 4/1985 | Germany . | |
| 3841330 | 6/1990 | Germany | 277/207 A |
| 4108107 | 11/1992 | Germany | 285/230 |
| 405837 | 7/1966 | Switzerland . | |
| 372669 | 5/1932 | United Kingdom | 285/231 |
| 374493 | 6/1932 | United Kingdom | 277/207 A |

*Primary Examiner*—Scott W. Cummings
*Attorney, Agent, or Firm*—Gifford, Krass, Groh, Sprinkle, Patmore, Anderson & Citkowski, P.C.

[57] ABSTRACT

A seal between two interlocking concrete components in which the seal (3) is bonded into the cone sleeve together with a body (12) of light material, said body providing a yielding region at the base of the sleeve near the sleeve surface.

13 Claims, 3 Drawing Sheets

SEAL BETWEEN TWO TELESCOPICALLY INSERTABLE CONCRETE COMPONENTS

This invention relates to a seal between two telescopically insertable concrete components, particularly tubes, wherein each concrete component comprises a bell-shaped socket having axially and radially extending inner surfaces, and a spigot end which, together with an inserted gasket, fit into one another and wherein the gasket is fixed to the socket by anchoring means.

Seals of this kind are known in numerous embodiments (see German patents nos. 2,140,546, 2,252,089, 2,935,392, 3,100,192, 3,232,823, 3,345,569, 3,507,909 and 4,104,851). With these seals, the gasket is bonded and integrated in the socket when the concrete component is being produced. For forming the socket, a forming tool, the so-called mold bushing, is used in which a form ring, for example made of foamed polystyrene, is inserted so as to correctly position and hold the gasket when the concrete component is molded. Late on, the form ring is removed. It is known to dispense with the removable form ring at a seal of the kind referred-to above (see German patents nos. 3,345,569, 3,507,909 and 4,108,851). In this case, a lot of expensive elastomeric material is needed to realize the seal.

It is an object of the invention to provide a seal of the kind referred-to above which can be produced more economically than prior art devices.

The solution to this problem is based on the fact that the gasket has a sealing area of a relative solid elastomer material and an extension which covers an annular space to take up a compressible light material body and lines the axially extending inner surface of the socket at its transition to the radially extending inner surface thereof.

This seal device can be produced with lower costs compared to a seal having a removable form ring, since no such form ring has to be removed. Compared to a seal without form ring, the seal of the invention has the advantage that elastomer material is saved, since such elastomer material is only used for the sealing area leaving out the thin extension covering the light material body.

Further embodiments and developments of the invention are characterized in dependent claims.

Embodiments of the invention are described in the following description taken in connection with the accompanying drawings.

Figure 1:
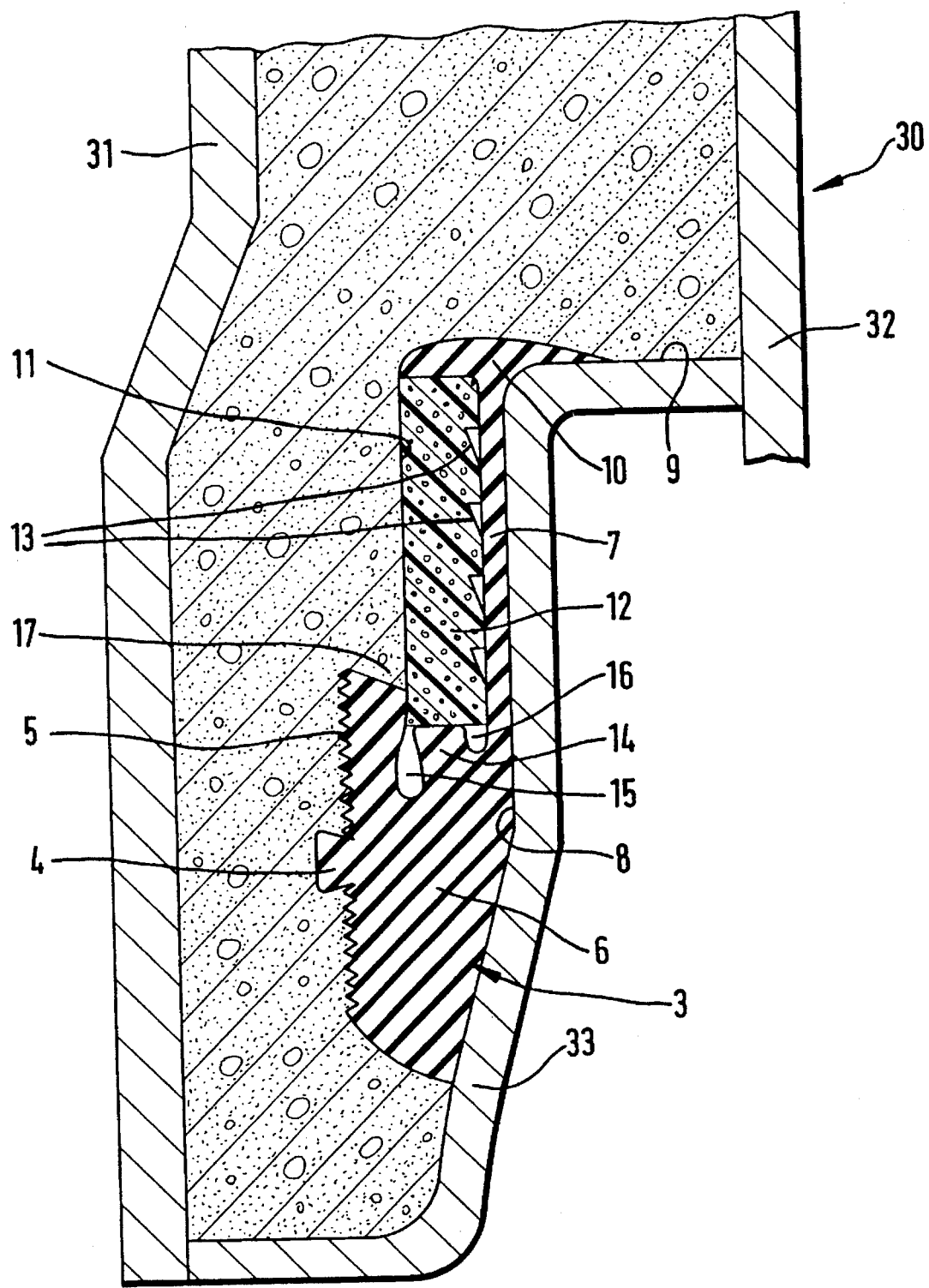
FIG. 1 is a sectional view through the rim portion of a socket when being produced showing a first embodiment of a gasket.

FIG. 1 shows how to produce a conrete tube using a mold 30 which comprises an outer sleeve 31, an inner sleeve 32 and an annular mold bushing 33 on the underside. There is shown only a portion of the bell-shaped socket 1, the mold extends essentially higher and is to be supplemented to the right hand side, the spigot end 2 being formed at the upper end. Integrated in the socket 1 is a gasket 3 which is anchored in the concrete of the socket by feet or flanges 4 and teeth or serrations 5. The gasket 3 includes a solid elastomer body 6 and a thin lug-like extension 7 which covers the axial extending inner side of the socket 8 and a portion of the radially extending inner side 9 thereof. A T-shaped head 10 is formed at the extension 7, the portions 6, 7 and 10 of the gasket defining an annular space 11 wherein a compressible light material body 12 is provided. Hooks or teeth 13 on the extension 7 provide for holding the light material body 12 within the annular space 11. The elastomer body 6 comprises a flap 14 which is directed to the annular space 11 so as to form axial grooves 15 and 16 opening into the annular space 11. Furthermore, a step 17 is provided between annular space 11 and elastomer body 6.

The light material body 12 consists of a compressible material as is foamed polystyrene which however should have sufficient stability so as to support without collabating the pressures occuring when the concrete components are formed. As shown, the polystyrene is a cylindric ring having a rectangular cross section, and such rings can be easily produced. For example, tube stock can be cut in pieces, yet it is also possible to bend plate material into rings and to hoop the rims thereof by adhesive tape. Foamed polystyrene is, compared to the elastomeric material, sufficiently yielding so that essentially only the elastomer body 6 is bearing when the concrete components have been assembled and therefore the elastomeric body makes the seal between the tubes.

Figure 2:
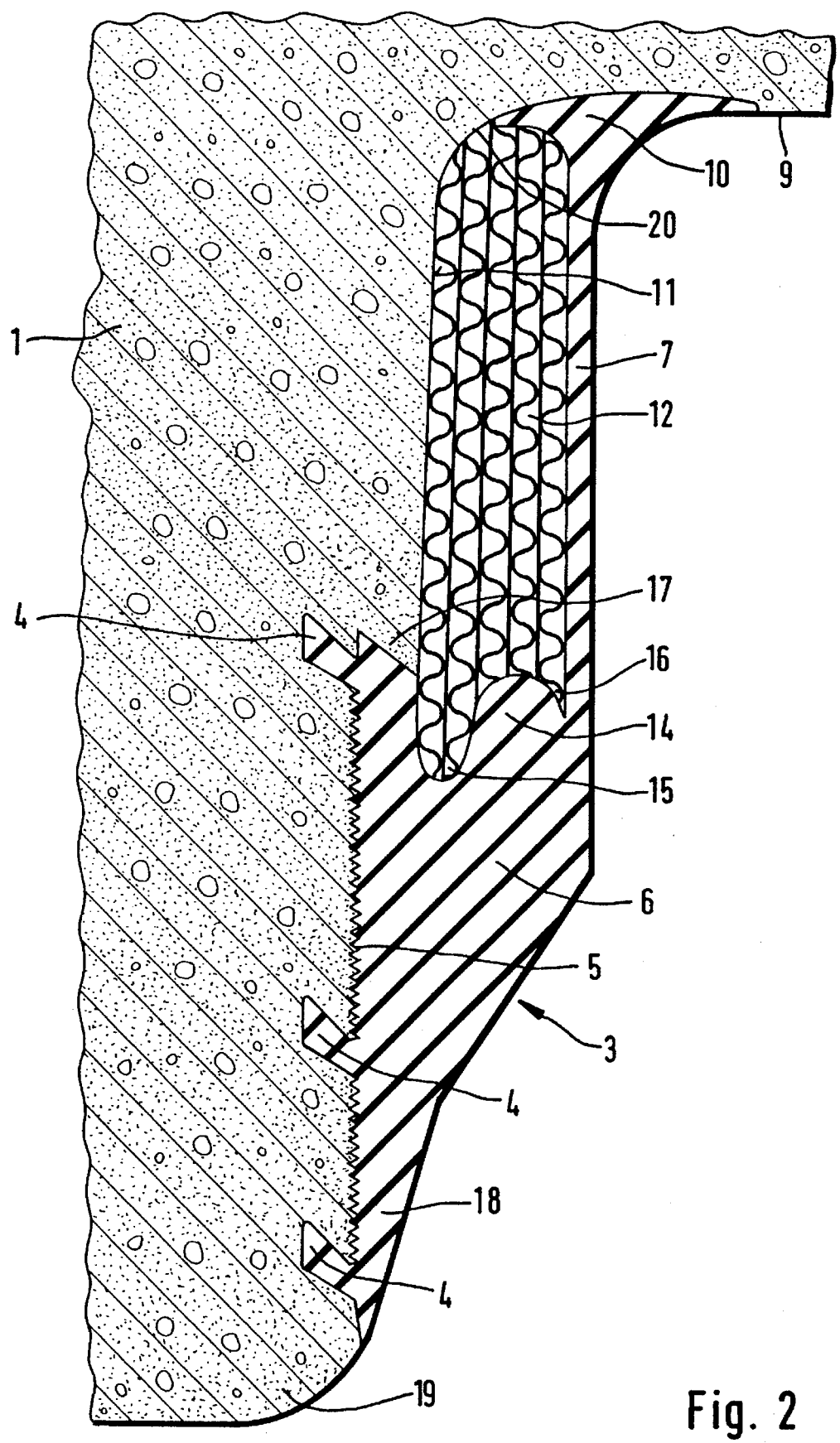
FIG. 2 is a sectional view through a second embodiment of the gasket.

FIG. 2 shows a second embodiment of the gasket 3 which includes a wedge-shaped extension 18, extending nearly to the rounding-off 19 of the bell-shaped socket 1. The gasket is bonded and integrated in the socket 1 by three dove-tailed feet or flanges 4. The light material body 12 is made as a coil of corrugated cardboard, the layers thereof can be moved relative to one another so as to reach into the groove 15. This favours formation of a rounding-off 20 at the transition of the axial inner surface 11 to the radial inner surface 9 and furthermore the cardboard is clamped to the gasket. The gasket has an enlarged radial thickness so as to span larger gap widths between socket and spigot end.

Figure 3:
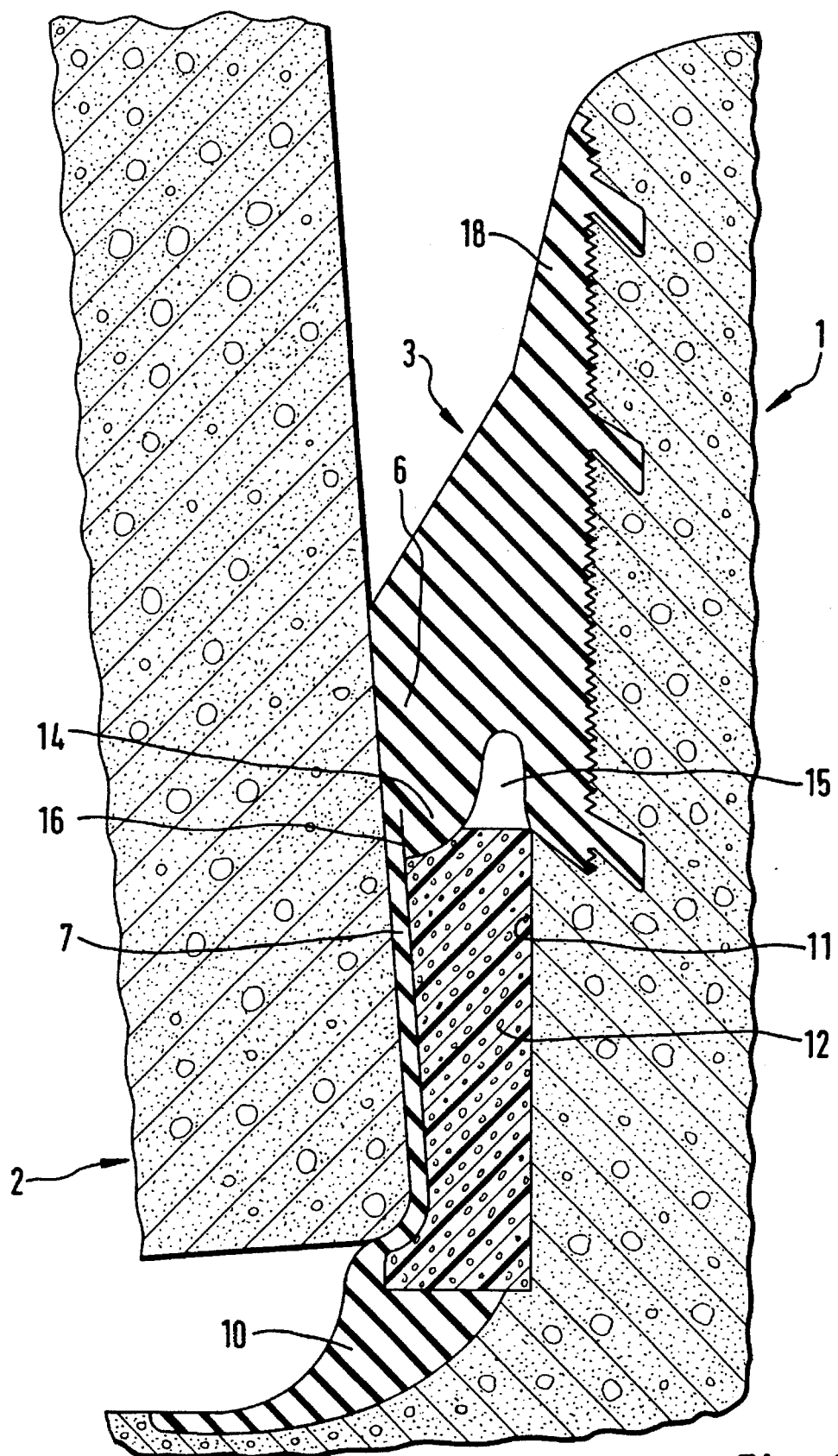
FIG. 3 shows the seal in operation.

FIG. 3 shows the cooperation of socket 1, spigot end 2 and gasket 3. If concrete tubes are telescopically inserted into one another, the axes thereof are aligned only in few cases, because either one does not succeed in exactly aligning the tubes or an angle between adjacent tubes is even desired. In these cases, the spigot end 2 will enter and press into the gasket 3 in the region of the light material body 12, as shown. Furthermore, the gap 16 will disappear due to the radial load between socket and spigot end, and the flap 14 will extend into the annular space 11 by partially displacing the light material body 12.

If the light material body 12 is acted upon by a larger radial load, it collapses so that a clearance is created at the axially extending inner surface of the socket near the radially extending inner surface thereof. For this reason, a seal including a form ring is provided which behaves similarly to the known seal where the form ring has been removed. With invention the form ring—the light material body 12—need not be removed. This leads to simpler handling and therefore to cost savings.

I claim:

1. A seal between two telescopically insertable concrete pipes comprising:

the concrete pipes each including a bell-shaped socket (1) having a socket end, an axially extending inner surface (8) and a radially extending inner surface (9), and a spigot end (2) which, when a gasket (3) is inserted, fit into one another;

the gasket (3) being fixed by anchoring means (4, 5) within the socket (1) and includes a sealing area 6 of solid elastomer material and a yielding area (7, 12) which is adapted to support loads as occurring when concrete pipes are molded, yet being compressible under the loads as occurring when assembling and using telescopically inserted concrete pipes, characterized in that the yielding area is formed by a lug-like extension which forms an annular space (11) adjacent to the socket and lines the axially extending inner surface (8) of the socket at the transition to the radially extending inner surface (9) thereof, and by a light material body (12) arranged within the annular space (11) between the solid elastomer material (7) and the axially extending inner surface (8) of the concrete pipe.

2. The seal set forth in claim 1 wherein the lug-like extension (7) is provided with teeth-like formations (13) so as to hold the light material body (12) when the socket (1) is molded.

3. The seal set forth in claim 1 wherein the light material body is made of foamed polystyrene.

4. The seal set forth in claim 1 wherein the light material body (12) is made of a coil of corrugated cardboard.

5. The seal set forth in claim 1, wherein the light material body (12) essentially is cylindrical.

6. The seal set forth in claim 1, wherein the elastomer sealing area (6) of the gasket (3) has a dimension in radial direction which is thicker to that of the annular space (11).

7. The seal set forth in any of claims 1 through 6 wherein the elastomer seal area 6 of the gasket 3 extends to adjacent the socket end of the socket by a thin wedge-like extension 18.

8. The seal set forth in claim 1, wherein the elastomer seal area (6) is provided with axial grooves (15, 16) which are open to the annular space (11).

9. The seal set forth in claim 1, wherein the lug-like extension (7) has a T-shaped head (10).

10. A seal between two telescopically insertable concrete components, comprising:

the concrete components each including a bell-shaped socket (1) having an axially extending inner surface 8 and a radially extending inner surface (9), and a spigot end (2) which, when a gasket 3 is inserted, fit into one another;

the gasket 3 being fixed by anchoring means (4, 5) within the socket (1) and includes a sealing area (6) of solid elastomer material and a yielding area (7, 12) which is adapted to support loads as occurring when concrete components are molded, yet being compressible under the loads as occurring when assembling and using telescopically inserted concrete components, characterized in that the yielding area is formed by a lug-like extension (7) which covers an annular space (11) adjacent to the socket and lines the axially extending inner surface (8) of the socket at the transition to the radially extending inner surface (9) thereof, and by a light material body (12) arranged within the annular space (11); said light material body (12) being made of a coil of corrugated cardboard.

11. A seal between two telescopically insertable concrete components comprising:

the concrete components each including a bell-shaped socket (1) having an axially extending inner surface 8 and a radially extending inner surface (9), and a spigot end (2) which, when a gasket (3) is inserted, fit into one another;

the gasket (3) being fixed by anchoring means (4, 5) within the socket (1) and includes a sealing area (6) of solid elastomer material and a yielding area (7, 12) which is adapted to support loads as occurring when concrete components are molded, yet being compressible under the loads as occurring when assembling and using telescopically inserted concrete components, characterized in that the yielding area is formed by a lug-like extension (7) which covers an annular space (11) adjacent to the socket and lines the axially extending inner surface (8) of the socket at the transition to the radially extending inner surface (9) thereof, and by a light material body (12) arranged within the annular space (11); said light material body (12) being substantially cylindrical.

12. A seal between two telescopically insertable concrete components comprising:

the concrete components each including a bell-shaped socket (1) having an axially extending inner surface (8) and a radially extending inner surface (9), and a spigot end (2) which, when a gasket (3) is inserted, fit into one another;

the gasket (3) being fixed by anchoring means (4, 5) within the socket (1) and includes a sealing area (6) of solid elastomer material and a yielding area (7, 12) which is adapted to support loads as occurring when concrete components are molded, yet being compressible under the loads as occurring when assembling and using telescopically inserted concrete components, characterized in that the yielding area is formed by a lug-like extension (7) which covers an annular space (11) adjacent to the socket and lines the axially extending inner surface (8) of the socket at the transition to the radially extending inner surface (9) thereof, and by a light material body (12) arranged within the annular space (11); and said lug-like extension (7) having a T-shaped head (10).

13. A seal between two telescopically insertable concrete components, having an axially extending inner surface, terminating in a rounding-off area and a radially extending inner surface opposite thereto and a spigot end, the socket end of a first telescopically insertable concrete component adapted to receive the spigot end of a second telescopically insertable concrete component, said seal comprising:

a gasket molded within a first telescopically insertable concrete component and received along the axially extending inner surface of said component having a first surface anchored within said first telescopically insertable concrete component;

anchoring means disposed along said portion of said first surface of said gasket body for fixing said gasket within the socket of said first telescopically insertable concrete component;

said gasket further including a second surface axially extending along the inner side of said socket, said first and second surfaces defining a sealing area therebetween formed of solid elastomer material compressible between said first and second concrete components and a yielding area formed along said axially extending inner side of said socket adjacent said sealing area, adapted to support loads occurring when said first telescopically insertable concrete component is molded, yet being compressible under loads occurring when assembling and using said first and second telescopically inserted concrete components, said yielding area being formed by a lug-like extension axially extending from said sealing area, having a periphery partially covering the axial inner side of the socket and partially covering the radially inward side of the socket, said lug-like extension and said sealing area further defining an annular space;

a compressible light body held within said annular space, cooperating with said yielding area of said gasket to compress when the spigot end of said second telescopically insertable concrete component is inserted into the socket of said first insertable concrete component.

* * * * *